US 6,533,178 B1

(12) United States Patent
Gaul et al.

(10) Patent No.: US 6,533,178 B1
(45) Date of Patent: Mar. 18, 2003

(54) DEVICE FOR CONTACTLESS TRANSMISSION OF DATA (75) Inventors: Lorenz Gaul, Lenting (DE); Martin Häring, Germering (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/713,485

(22) Filed: Nov. 15, 2000

Related U.S. Application Data (63) Continuation of application No. PCT/DE99/01412, filed on May 11, 1999.

(30) Foreign Application Priority Data

May 15, 1998 (DE) .......................................... 198 21 909
Sep. 30, 1998 (DE) .......................................... 198 45 065

(51) Int. Cl.⁷ .............................................. G06K 19/06
(52) U.S. Cl. ...................... 235/492; 235/380; 235/435; 235/441
(58) Field of Search ............................... 235/435, 492, 235/380, 441

(56) References Cited

U.S. PATENT DOCUMENTS

| 4,480,154 A | * | 10/1984 | Klee ............................ 179/84 |
| 5,047,007 A | * | 9/1991 | McNichols et al. ............. 604/20 |
| 5,241,160 A | | 8/1993 | Bashan et al. ................. 235/380 |
| 5,287,112 A | | 2/1994 | Shuermann .................... 342/42 |
| 5,418,353 A | * | 5/1995 | Katayama et al. ............ 235/380 |
| 5,461,215 A | * | 10/1995 | Haldeman ..................... 219/677 |
| 5,866,891 A | * | 2/1999 | Fujimoto et al. ............. 235/435 |
| 5,999,409 A | * | 12/1999 | Ando et al. ................... 361/737 |
| 6,202,927 B1 | * | 3/2001 | Bashan et al. ................ 235/451 |

FOREIGN PATENT DOCUMENTS

| DE | 44 44 984 C1 | 12/1995 |
| EP | 0 377 257 A1 | 7/1990 |
| EP | 0 638 872 A1 | 2/1995 |
| GB | 2 208 025 A | 2/1989 |
| JP | 0525642 A2 * | 3/1992 |
| WO | WO 98/11504 | 3/1998 |

OTHER PUBLICATIONS

Klaus Finkenzeller: "RFID–Handbuch"[RFID handbook], Carl Hanser Verlag, München, 1998, pp. 182–205.

* cited by examiner

Primary Examiner—Michael G. Lee
Assistant Examiner—Seung Ho Lee
(74) Attorney, Agent, or Firm—Laurence A. Greenberg; Werner H. Stemer; Ralph E. Locher (57) ABSTRACT A device for a contactless transmission of data includes a data transceiver with an antenna. The impedance of the antenna of the data transceiver is purposely mismatched. A reactance is introduced into the antenna in order to tune the antenna to a frequency different from its resonant frequency. In the event that the antenna impedance has to be adapted to the characteristic impedance of a line of unknown length, the loss resistance of the antenna is deliberately increased. The power required to produce a magnetic alternating field with the data transceiver for operating at least one portable data carrier is reduced.

9 Claims, 5 Drawing Sheets

DEVICE FOR CONTACTLESS TRANSMISSION OF DATA

CROSS-REFERENCE TO RELATED APPLICATION

This application is a continuation of copending International Application No. PCT/DE99/01412, filed May 11, 1999, which designated the United States.

BACKGROUND OF THE INVENTION

Field of the Invention

The invention relates to a device for a contactless transmission of data between a data transceiver and at least one portable data carrier.

Contactless identification systems with inductive transmission of energy and data from a data transceiver (COD—Card Operating Device) onto a portable data carrier via an alternating magnetic field are used, for example in the case of chip cards. Such a system is described by Klaus Finkenzeller in the book entitled "RFID-Handbuch" [RFID (radio frequency identification) manual], Carl Hanser Publishers Munich 1998, pages 183 to 205. Operating the chip cards with the data transceiver requires a given power to generate the alternating magnetic field.

The antenna for generating the alternating magnetic field is generally an arbitrarily shaped conductor loop. The conductor loop has an inductive reactance under the usual operating conditions. In the normal case, this inductive reactance is compensated through the use of a matching circuit composed of resistors, capacitors and coils, and the antenna is thereby tuned to a resonant frequency. Tuning to the resonant frequency means that the inductive reactance has a value equal to zero, and that essentially only the loss resistances remain as impedance.

It is necessary to match the antenna to resonance when the antenna and the power source are connected in the data transceiver via a cable of unknown length. In order to remain independent of the cable length, the antenna and the power source must be matched to the characteristic impedance of the line. The matching of the antenna to the characteristic impedance is described, for example, in U.S. Pat. No. 5,241,160.

Operation in resonance is usually also employed when the antenna is connected directly to the power source. This is the case, for example, whenever the antenna and the power source are mounted on the same printed circuit board.

When no portable data carrier is located in the alternating magnetic field, a maximum current flows in the case of tuning the antenna to resonance. This maximum current entails a maximum magnetic field.

Consequently, tuning to resonance also causes high losses in no-load operation. No-load operation is understood in the following as the operating state of the data transceiver in which no portable data carrier is located in the active field of the data transceiver. The active range of the data transceiver is that distance from the data carrier to the antenna at which the alternating magnetic field is still just sufficiently large to enable data to be exchanged with the portable data carrier.

The alternating magnetic field, which is generated by the current flowing through the antenna, is mostly much stronger than actually required, particularly in the case of data transceivers of short range (so-called closed coupling systems).

If a portable data carrier is located in the active field, the latter reacts on the antenna. This reaction or feedback can be seen in the occurrence of an additional impedance in the antenna circuit of the data transceiver. If the antenna is tuned to resonance, this reaction is a maximum, that is to say the additional impedance occurring in the antenna circuit effects a reduction in the antenna current, and thus simultaneously a reduction in the magnetic field. This reaction or feedback increases with an increasing coupling between the antenna and the portable data carrier. The coupling is generally larger for smaller distances between the antenna and the portable data carrier. In the most unfavorable case, as the antenna is approached, the portable data carrier can reduce the current through the latter because of the reaction to such an extent that an adequate power supply between the data transceiver and the data carrier is no longer possible.

In order to ensure operation of the data carrier in the active field of the data transceiver, it is therefore necessary, when the antenna is tuned to resonance, to maintain a correspondingly high current in the no-load operation. This ensures that, when a data carrier is in the active range, the magnetic field strength is still adequate, despite the reaction, to preserve an adequate power supply for the data carrier. This means that the current through the antenna is sufficiently strong when a data carrier is brought into the active field very high losses occur as a consequence of the high power for generating the alternating magnetic field in no-load operation.

The mode of operation described in the case of configuring the antenna for resonance is even more disadvantageous when the system is configured for a plurality of data carriers. The reaction or feedback of a plurality of data carriers to the antenna circuit is then multiplied in accordance with the number of the data carriers located in the active field. The power source providing the power for the data transceiver must therefore be even larger, which results in an increase of the required space and in high costs.

SUMMARY OF THE INVENTION

It is accordingly an object of the invention to provide a device for a contactless transmission of data which overcomes the above-mentioned disadvantages of the heretofore-known devices of this general type and which consumes only little power for generating an alternating magnetic field for a given active range.

With the foregoing and other objects in view there is provided, in accordance with the invention, a device for a contactless transmission of data between a data transceiver and at least one portable data carrier, including:

a data transceiver and a portable data carrier;

the data transceiver includes a transmitting device for producing a first signal of a given frequency; a receiving device for receiving a second signal of a given frequency; an impedance-transformed antenna connected to the transmitting device and to the receiving device; and a power supply connected to the transmitting device;

the portable data carrier includes a data carrier antenna for one of receiving and transmitting an induced signal; a circuit configuration connected to the data carrier antenna for processing the induced signal and for producing a signal to be transmitted to the impedance-transformed antenna of the data transceiver; the impedance-transformed antenna of the data transceiver having a total impedance composed of a reactance and an ohmic loss resistance, the reactance being not equal to zero when the portable data carrier is not inductively connected to the impedance-transformed antenna of the data transceiver.

In other words, according to the invention the antenna of the data transceiver is configured in terms of the total impedance, that is to say in a circuit which performs an impedance transformation, such that the reactance is non-vanishing when no portable data carrier is inductively connected to the antenna. In other words, this means that the antenna is not tuned to resonance if no portable medium is located in the active range of the data transceiver.

In this way, the introduction of a reactance into the antenna reduces the current which has to be maintained in the case of a no-load operation by comparison with the prior art. This entails lower low-load losses. For this reason, the power supply can be less powerful and/or of smaller dimensions. There is no need to provide an expensive cooling device. A further advantage is that, due to the reactance already present in no-load operation, upon the introduction of a data carrier, the reaction or feedback in relation to the data carrier on the antenna can be reduced, in other words it is used in an advantageous way. This has the consequence, for example, that the current reduction due to the introduction of the data carrier into the active field is substantially smaller than the current drop in the case of a data transceiver according to the prior art. It is thereby possible to avoid the problem that the current in the antenna can be cut off due to the introduction of a data carrier into the active field.

The reactance can be both, an inductive-type reactance or a capacitive-type reactance. It is even possible to set the reaction of the cards to the antenna so as to produce a defined increase in the antenna current for a given layout case, for example three data carriers which must still operate in a given range of x cm. The reactance must be appropriately dimensioned for this purpose. The reactance can be determined only through the use of a complicated simulation calculation. The power required by the data transceiver for generating the alternating magnetic field or for the power supply of the data carriers can be substantially reduced by the proposed measure of specifically introducing a reactance into the antenna circuit.

In a preferred embodiment of the invention, it is also possible to combine the two solutions. This means that the antenna of the data transceiver can have both a reactance, that is to say is therefore not tuned to resonance, and an additional loss resistance. As a result of this additional loss resistance, which is located, for example, between the antenna and the matching circuit, the current is reduced in no-load operation of the data transceiver, and thus the low-load losses are reduced. The reaction of the data carriers located in the magnetic field of the data transceiver on the antenna is, in turn, reduced by the provision of the additional loss resistance. The reaction caused by the occurrence of an impedance in the antenna circuit of the data transceiver is certainly also noticeable in a reduction in the current through the antenna which is associated with a reduction in the magnetic field strength. However, the current drop is substantially less pronounced than in the case of a data transceiver according to the prior art. Due to the low current drop upon the introduction of a data carrier into the active field, the required strength of the alternating magnetic field remains high enough, although the power supply of the data transceiver can be small, and the transceiver thereby also provides a lower current through the antenna.

In accordance with another feature of the invention, an additional resistance is provided between the impedance-transformed antenna and the transmitting device and/or the receiving device.

In a further embodiment, the data transceiver, whose antenna has an inductive reactance and an additional resistance provided between the antenna and the transmitting device or the receiving device, has a matching circuit device between the antenna and the transmitting device or the receiving device.

In a further embodiment, the various solutions, with which the power reduction in the power supply of the data transceiver is effected through the use of a reactance in the antenna, have a connection of known length which interconnects the antenna and the transmitting device and/or the receiving device. There is no need to provide a matching circuit when use is made of a connection, for example a cable, of known length.

With the objects of the invention in view there is also provided, a device for a contactless transmission of data between a data transceiver and at least one portable data carrier, including:
  a data transceiver and a portable data carrier;
  the data transceiver includes a transmitting device for producing a first signal of a given frequency; a receiving device for receiving a second signal of a given frequency; a line of unknown length, the line having a characteristic impedance; a data transceiver antenna connected to the transmitting device and to the receiving device via the line of unknown length; a matching circuit configuration connected between the data transceiver antenna and at least one of the transmitting device and the receiving device, the matching circuit configuration having at least one resistance limiting a factor Q for matching a total impedance to the characteristic impedance of the line, and the matching circuit having an additional loss resistance;
  the portable data carrier includes a data carrier antenna for transmitting and for receiving an induced signal; and a circuit configuration, connected to the data carrier antenna, for processing the induced signal and for producing a signal to be transmitted to the data transceiver antenna.

In other words, the matching circuit has an additional loss resistance in addition to the resistor which serves to limit the factor Q. The matching circuit configuration, which includes at least a resistor for limiting the factor Q as well as capacitors and/or coils, is introduced between the antenna and the transmitting device and/or the receiving device. The matching circuit configuration serves to match the total impedance to the characteristic impedance of a line of unknown length. The same effect and the same advantages as described above are achieved with this measure. Again, the reaction of the data carriers, located in the field of the data transceiver, on the antenna is thereby reduced. The consequence is that it is possible to maintain in no-load operation a current which is reduced by comparison with the prior art.

A preferred solution is achieved by introducing a reactance into the antenna of the data transceiver. The lowest currents in no-load operation can be achieved through the use of this solution. Of course, it has been assumed in this case that the boundary conditions are the same for all variants. This means that the data transceiver is configured for a specific number of data carriers, and the active range in which data can be exchanged between the at least one data carrier and the data transceiver assumes a prescribed distance from the antenna.

The advantage of all the above-described solution principles is that the output stage of the power supply (AC voltage source) can be dimensioned for lower powers due to the reduction in the required antenna current. This results in a reduction in costs. A further advantage is that, by comparison with the prior art, the circuit configuration requires no additional circuit elements between the power supply and the antenna. The components are only differently dimensioned.

The power transmission via an inductive coupling utilizes only the magnetic near field of the antenna. However, this also unavoidably entails emission of electromagnetic waves. The emitted power is directly proportional to the square of the antenna current in this case. This means that the reduction in the antenna current simultaneously reduces the effectively emitted power. This facilitates the observance of norms or standards which require a limited emission. These problems will be explained later.

In the solution in which an additional resistance is inserted between the antenna and the matching circuit, the sum of the resistance relating to the limitation of the factor Q and the additional loss resistance is calculated using the following formula:

$$R \approx \frac{k_{\min}(k_{\max}(2\pi f_0)^2 L_F L_T}{2 \cdot |B_T|} - R_F.$$

A calculation using this formula, which takes account of the configuration of the data transceiver (number of data carriers, active range) yields the maximum power reduction in no-load operation. The data transceiver then operates reliably in all operating states. A drop (=cutoff) of the current to unfavorable values in the antenna of the data transceiver cannot occur given dimensioning using this formula.

The resonant frequencies of the portable data carriers can be dimensioned either to be equal to the prescribed operating frequency of the data transceiver, or else to be greater than or less than the prescribed operating frequency. In a preferred embodiment, the resonant frequency of the portable data carriers is configured to be higher than the prescribed frequency. The circuit configuration located on the portable data carrier is supplied with voltage by the induced signal which is produced upon the introduction of the data carrier into the active field of the data transceiver in the data carrier antenna. Use is made for this purpose of the resonant increase by a series resonant circuit composed of a capacitor and the inductor of the data carrier antenna. The mode of operation will be explained more precisely later in conjunction with the figures.

The circuit configuration on the portable data carrier can be configured as an integrated semiconductor chip or as a discrete circuit. Chip cards, security labels for various objects, or else identification devices can be understood as portable data carriers. However, it is also conceivable for the portable data carriers to be installed, for example, in motor cars, so that tolls may be paid for the use of specific roads.

The data transceiver according to the invention and the data carrier antenna are capable of coupling with one another in a range of between 0 and 1 m. The data transceiver is preferably configured such that the antennas are coupled in a range of between 0 and 1 cm. In the case of data carriers in the so-called CD-1 format (check cards, defined in ISO), the data carrier and data transceiver are coupled in a range of between 0 and a few centimeters (e.g. 4 cm). Such data transceivers are called closed coupling systems.

In a configuration of the data transceiver for a range from 0 to 15 cm, the systems are called proximity systems. In the range of between 0 and 1 m, the data transceivers are termed vicinity systems. The field of application of the invention is, however, not limited thereto—rather, it depends on the relative sizes of the antenna and data carrier.

Other features which are considered as characteristic for the invention are set forth in the appended claims.

Although the invention is illustrated and described herein as embodied in a device for contactless transmission of data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
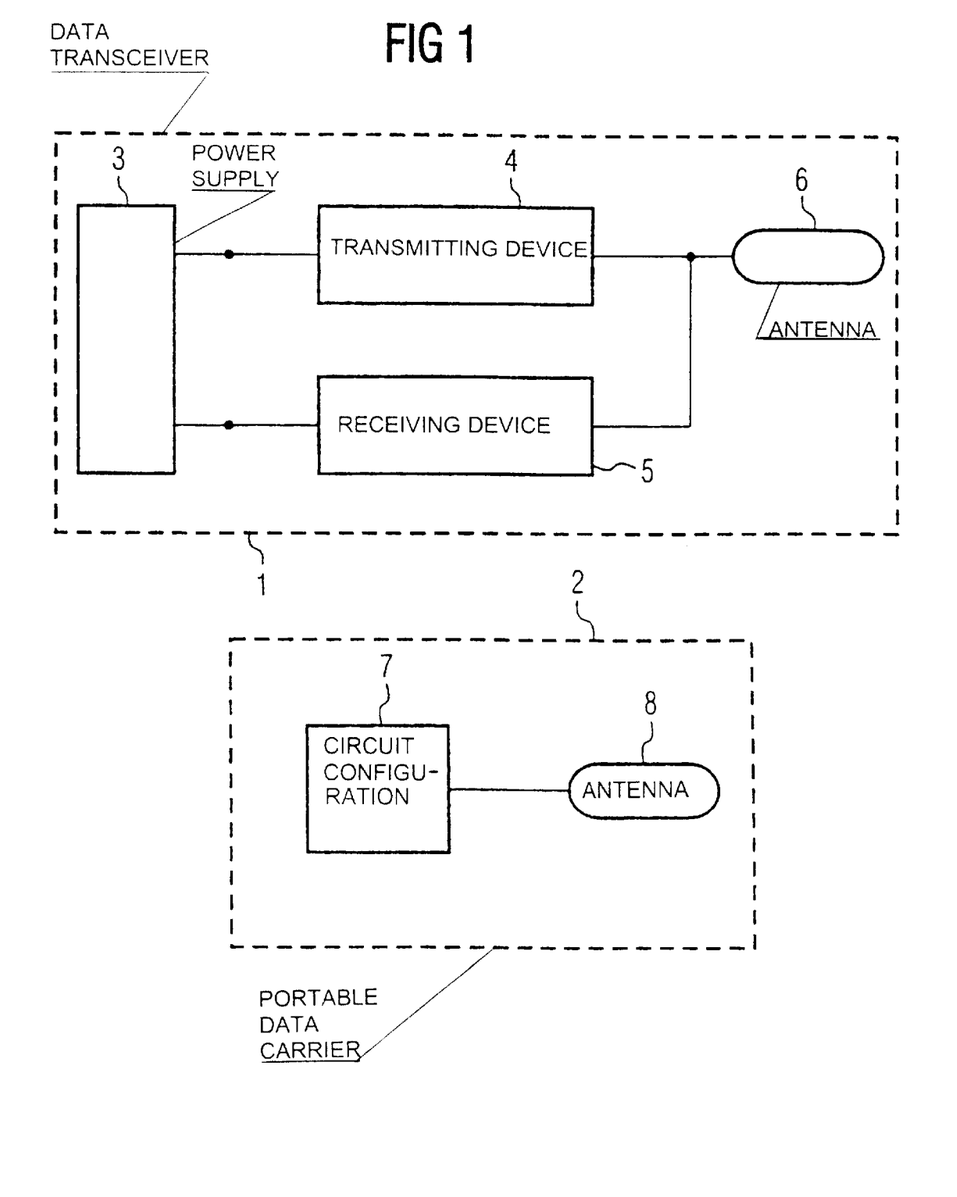
FIG. 1 is a schematic block diagram of a device for a contactless transmission of data including a data transceiver and a portable data carrier according to the invention.

Referring now to the figures of the drawings in detail and first, particularly, to FIG. 1 thereof, there is shown a schematic of a data transceiver 1 and a portable data carrier 2. The data transceiver 1 has a power supply 3 as well as a receiving device 5 and a transmitting device 4. Both the transmitting device 4 and the receiving device 5 are interconnected with the aid of an antenna 6. In the simplest case, the antenna 6 is an arbitrarily shaped conductor loop. Both the transmitting device 4 and the receiving device 5 are connected to the power supply 3. As a rule, the transmitting device 4 has, inter alia, a crystal, an oscillator, a modulator and a power output stage. The receiving device 5 includes, for example, a bandpass filter, an amplifier and a demodulator. Since the precise configuration both of the transmitting device 4 and of the receiving device 5 is not essential to the idea of the invention, no further details will be given thereon.

The portable data carrier 2 has a data carrier antenna 8 and a circuit configuration 7. The circuit configuration 7 can be configured, for example, as an integrated semiconductor chip or else in the form of a discrete circuit. The circuit configuration 7 can, for example, have a matching circuit which connects the circuit configuration 7 to the data carrier antenna 8. Furthermore, the circuit configuration 7 can include a modulator, a demodulator, a microprocessor or else a memory, as well. Since the precise configuration of the circuit configuration 7 is not essential to the invention, no further details will be given thereon.

The mode of operation of the data transceiver is as follows: The transmitting device 4 produces a signal with a predetermined frequency, which will be denoted in future as operating frequency $f_0$. This signal is relayed by the transmitting device 4 to the antenna 6 of the data transceiver. If the portable data carrier 2 is located in the active range of the data transceiver 1, the signal produced by the antenna 6 is transmitted to the portable data carrier 2, where it is converted by the data carrier antenna 8 into an induced voltage. This induced voltage both ensures the operating voltage of the circuit configuration 7 and equally includes the information which is to be transported and is processed by the circuit configuration 7.

In the opposite case, a signal is transmitted by the circuit configuration 7 to the data carrier antenna 8, this signal transmitted with a specific frequency by the data carrier antenna 8 induces a voltage in the antenna 6 of the data transceiver 1. This signal is fed to the receiving device 5 and conditioned there.

Figure 2A:
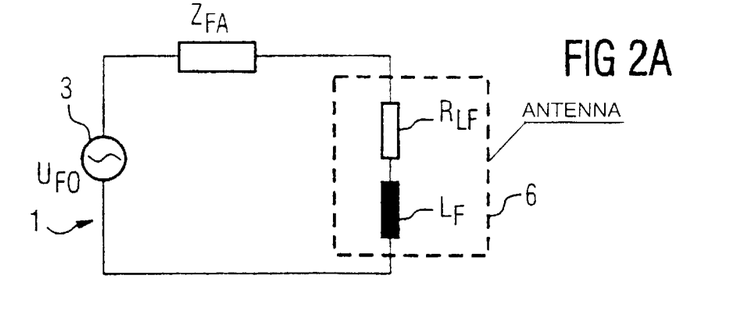
FIGS. 2a and 2b are simplified linear equivalent circuit diagrams of a data transceiver and a portable data carrier according to the invention.
Figure 2B:
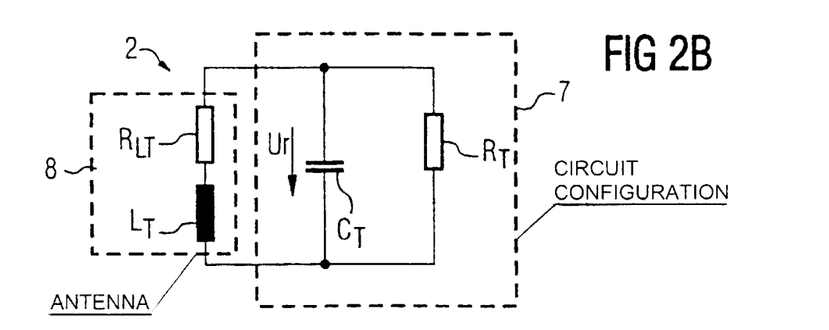

FIG. 2a shows an equivalent circuit diagram of a data transceiver 1. The antenna itself has an inductive reactance. A simple linear equivalent circuit diagram of a portable data carrier 2 is illustrated in FIG. 2b. The power supply 3 and the entire circuit between the power supply and the antenna 6 of the data transceiver 1 can be reduced to an equivalent voltage source $U_{F0}$ (source voltage, in the time domain $\hat{U}_{F0}*\sin(2\pi ft)$) and an internal impedance $Z_{FA}$. The internal impedance can include an arbitrary interconnection of resistors R, inductors L and capacitors C. The antenna 6 is modeled as an inductor $L_F$ and a loss resistor $R_{LF}$. The equivalent voltage source $U_{FO}$ and the internal impedance $Z_{FA}$ as well as the inductor $L_F$ and the loss resistor $R_{LF}$ of the antenna 6 are interconnected in the form of a series circuit. The equivalent circuit diagram in FIG. 2a reproduces the data transceiver 1 in a state in which there is no portable data carrier within the active range. This means no coupling exists between the antenna of the data transceiver and an antenna of a portable data carrier.

In FIG. 2b, the data carrier antenna 8 is modeled from a loss resistor $R_{LT}$ and an inductor $L_T$. The resistor $R_{LT}$ and the coil $L_T$ are interconnected in series. The circuit configuration 7, which can, for example, be implemented as an integrated semiconductor chip, can include in a simplified fashion a loss resistor $R_T$ and a capacitor $C_T$ connected in parallel therewith. The circuit configuration 7 is connected in parallel with the data carrier antenna 8. In FIG. 2b, as well, the portable data carrier 2 is in a state in which there is no coupling between the antennas of the data transmitter or another portable data carrier. Because of the magnitude of the capacitor $C_T$, the portable data carrier 2 exhibits a predominantly capacitive response.

The total impedance of the antenna circuit is given by the following equation:

$$Z_F = R_F + j \cdot B_F = Z_{FA} + R_{LF} + j \cdot \omega \cdot L_F,$$

The reactive component of this impedance is 0 in the case of matching or in the case of resonance.

The total impedance of the series resonant circuit of the data carrier is:

$$Z_F = R_T + j \cdot B_T = R_{LT} + j \cdot \omega \cdot L_T + \frac{1}{1/R_T + j \cdot \omega \cdot C_T},$$

Figure 3A:
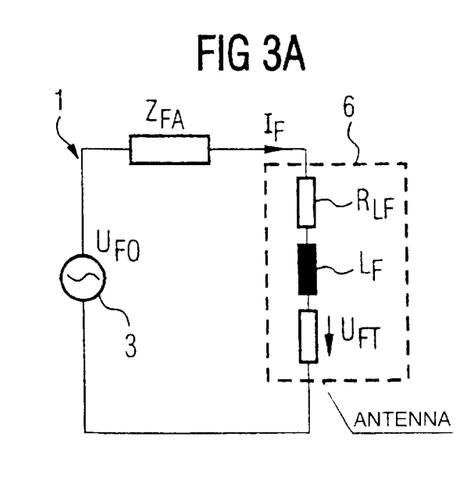
FIG. 3a is an equivalent circuit diagram of the data transceiver according to the invention when a portable data carrier is located in the active range.
Figure 3B:
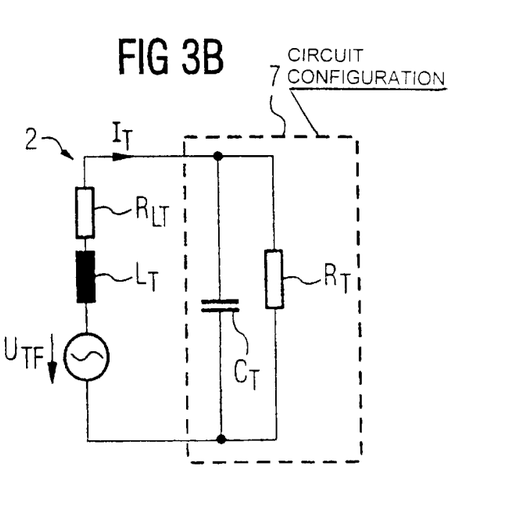
FIG. 3b is an equivalent circuit diagram of a portable data carrier according to the invention which is located in the active range of the data transceiver according to the invention.

FIGS. 3a and 3b show the equivalent circuit diagrams of the data transceiver 1 and the portable data carrier 2, respectively, when these are intercoupled, that is to say when the portable data carrier 2 is located in the active range of the data transceiver 1. Because of the coupling of the antenna 6 to the data carrier antenna 8, induced voltages occur in series with the inductances because of the law of magnetic flux. In this case, $U_{TF}$ is the voltage induced in the card coil by the field current $I_F$, and $U_{FT}$ represents the voltage induced in the antenna coil by the data carrier current $I_T$. This relationship can be expressed by the following formulae:

$$U_{FT} = -j\omega \cdot M \cdot I_T$$

$$U_{TF} = j\omega \cdot M \cdot I_F$$

where

ω: angular frequency (=2πf), j: imaginary unit, and

M: mutual inductance.

A coupling factor k can be defined from the mutual inductance M and the self-inductances of the two coils:

Coupling Factor $$k^2 = \frac{M^2}{L_F \cdot L_T}.$$

Given the minimum distance between the antenna and the data carrier, the coupling factor can become at most 1. The coupling factor becomes 0 for an infinite distance.

A free selection of impedance of the antenna circuit 6 is provided in accordance with the first embodiment of the invention, there being no need for matching to the characteristic impedance of a line between the antenna 6 and the power supply 3. In concrete terms, this means that the antenna 6 and the power supply 3 are interconnected in a defined fashion, and therefore the total impedance of the antenna circuit may have a reactive component. A defined connection of the antenna 6 to the power supply 3 can be understood as a cable of known length, or else connecting the antenna and the transmitting or receiving device in a fashion directly next to one another so as to minimize the line between the antenna 6 and the power supply 3.

In principle, depending on the required system properties, different mistunings can lead to power minimization.

It is possible to dimension the reactive component such that in the most unfavorable case (the maximum possible number of portable data carriers are located in the active field) the reaction of the portable data carriers 2 on the antenna 6 increases the antenna current so much that operation without difficulty is possible. This means nothing other than that in no-load operation the current through the antenna 6 is a minimum and is somewhat increased by the introduction of each data carrier 2. Because of the reaction of the data carriers 2, the current matches the demand. If the data carriers 2 have a resonant frequency which is higher than that of the prescribed data transceiver 1, this optimization is denoted as inductive mistuning of the antenna circuit.

The magnitude of the inductive reactance, which effects an automatic increase in the antenna current upon introduction of a data carrier into the active field, can be found only by complicated simulation calculations. The mode of operation can be explained as follows:

If a card is introduced into the active field given inductive tuning of the total impedance of the antenna circuit $Z_F$ of the data transceiver, the predominantly capacitive impedance $Z_T$ of the series resonant circuit of the data carrier in the antenna circuit of the data transceiver appears as inductive impedance $Z_{FT}$. Since the absolute value of the transformed impedance $Z_{FT}$ is much smaller than the impedance $Z_F$ of the antenna circuit, the reaction to the antenna current is only very small. The antenna current with a data carrier in the active field therefore decreases only slightly with respect to the antenna current when no data carrier is located in the active field.

However, if a plurality of data carriers are introduced into the active field of the data transceiver, the impedances couple the data carriers among one another. Coupling the impedances of the data carriers changes their impedance $Z_T$, the latter exhibiting predominantly inductive behavior in each case given a strong coupling of the data carriers among one another. This predominantly inductive impedance appears in the antenna circuit as capacitive impedance $Z_{FT}$. In the case of the inductive tuning of the total impedance of the antenna circuit, the capacitive impedance $Z_{FT}$ partially compensates the inductive impedance $Z_F$ so as to produce a current increase in the antenna circuit in the most unfavorable case of a strong coupling of the data carriers among one another and a maximum distance of the data carriers from the reader unit.

If the total impedance $Z_F$ of the antenna circuit of the data transceiver is capacitively tuned, a current increase can be set upon introduction of the data carrier. The predominantly capacitive impedance $Z_T$ of the data carrier appears once again as a predominantly inductive impedance in the antenna circuit. The capacitive tuning of the antenna circuit, and the inductive impedance, which is transformed into the antenna circuit by the data carrier, partially compensate one another, such that a current increase is possible. The capacitive impedance of the antenna circuit can be set so as to produce the largest current increase for a maximum distance of the data carrier.

If a relatively large number of data carriers are introduced into the active range of the data transceiver, the data carriers are once again coupled among one another, such that they appear in the antenna circuit as a capacitive impedance. Since the transformed impedance of the data carriers is very much lower than the total impedance of the antenna circuit, the result once again is only a small reaction to the antenna current. It is, however, impossible for the antenna current to be cut off should the data carriers closely approach the data transceiver.

The principle of the coupling of the data carriers among one another is described further below.

It is mainly the required system properties which determine the degree to which optimization is possible. The system properties are determined from the number of the data carriers in the active field for which an exchange of data between the data carrier and the data transceiver is to function without difficulty, and by the maximum distance from the antenna of the data transceiver up to which it is to be possible to couple the data carriers to the data transceiver. The optimization potential is greatest in the case of the so-called closed coupling systems.

The following boundary condition is still to be observed for optimizing the power consumption of the antenna of the data transceiver. Since the circuit configuration 7 of the portable data carrier 2 has no dedicated power supply, the operating voltage $U_T$ required for the circuit configuration 7 must be obtained from the signal, which is induced by the data transceiver into the data carrier antenna. In this case, it is the so-called resonant increase which is utilized by the series resonant circuit of the capacitor $C_T$ and the inductor $L_T$ of the portable data carrier 2.

If a plurality of data carriers 2 are located in the active field of the data transceiver 1, the data carriers 2 are not only coupled to the antenna 6, but also among one another. The resonant frequency of each data carrier resonant circuit drops due to this coupling among one another. The resonant frequency drops further the more strongly the data carriers are coupled to one another, that is to say the closer the distance between the two data carriers, and the more data carriers there are in the active field. In the most unfavorable case, the resonant frequency of a data carrier can be reduced because of the coupling of the data carriers among one another by the factor $1/\sqrt{N}$, N being the number of the data carriers. The most unfavorable case would occur whenever the data carrier antennas have a spacing of 0 cm and the coils were brought into congruence one above another. This cannot occur in practice, since the antennas are generally surrounded in a housing, for example by a plastic coating in the case of a chip card.

Figure 4:
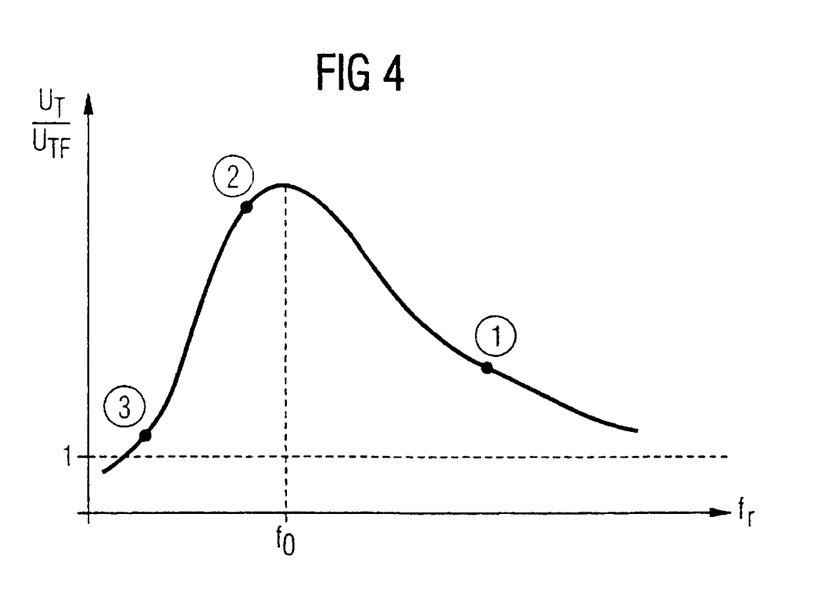
FIG. 4 is a graph illustrating the normalized characteristic of the operating voltage of one or more portable data carriers, plotted against the resonant frequency.

FIG. 4 illustrates the relationship of the drop in the resonant frequency for the case of the coupling of a plurality of data carriers among one another. For this purpose, the voltage $U_T$ present at the input of the circuit configuration 7 of the data carrier 2 is normalized to the voltage $U_{TF}$ induced in the data carrier antenna 8 by the antenna 6 of the data transceiver 1. It is advantageous for operating a data carrier that the ratio between $U_T$ and $U_{TF}$ is greater than 1. In this case, an adequate voltage supply of the circuit configuration 7 is already ensured given appropriately large distances. If the data transceiver is configured for exactly one data carrier, the resonant frequency of the data carrier is ideally tuned to the provided frequency $f_0$ of the data transceiver. The ratio between $U_T$ and $U_{TF}$ is greatest in this case. The resonant increase is utilized only partially in the case of a configuration of the data transceiver for a plurality of cards.

For this purpose, the resonant frequency of each data carrier is configured to be higher than the provided frequency $f_0$. If a data carrier is located in the active field of the data transceiver, the ratio between $U_T$ and $U_{TF}$ is at point 1 in FIG. 4. If a second data carrier is introduced into the active field, the two data carriers are coupled to one another, and the resonant frequencies of the two data carriers drop. In this case, point 2 is reached in the figure, for example. This point already lies below the prescribed frequency $f_0$. The position of point 2 depends on the strength of the coupling between the two data carriers. This depends essentially on the distance of the two data carriers from one another. Point 2 can therefore be displaced still further to the left or right on the line shown in FIG. 4. If a further, third data carrier is introduced into the active field, the resonant frequency of all the data carriers drops further below the prescribed frequency $f_0$, and point 3 in the figure is reached. This point can also be displaced along the line shown in FIG. 4, depending on how the three data carriers are coupled among one another.

Utilization of the full resonant increase (the ratio of $U_T$ to $U_{TF}$ is a maximum) is not possible when operating with a plurality of cards, because different operating states are obtained depending on the number of the cards and their coupling. Consequently, it is advantageous to tune the resonant frequency of the data carriers above the prescribed frequency $f_0$. This amounts to saying that the reactive component of the impedance of a data carrier is capacitive. Each data carrier receives only a portion of the possible voltage overshoot. In the example shown in FIG. 4, the voltage overshoot is then also still present during the coupling of two data carriers.

Figure 5:
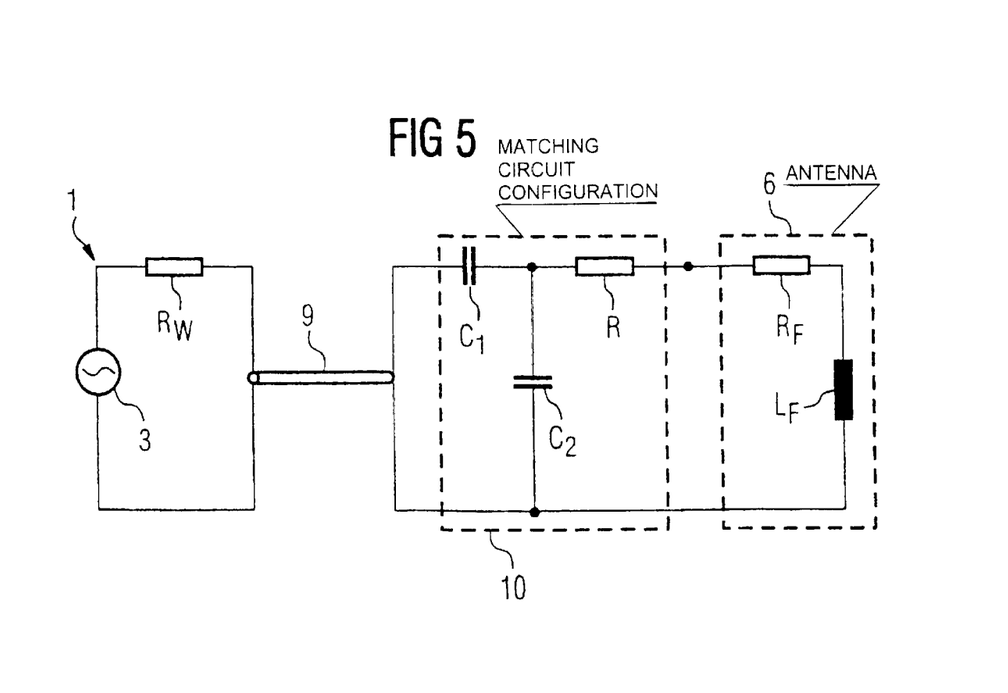
FIG. 5 is an equivalent circuit diagram of the data transceiver according to the invention, in which an additional resistor is introduced between the antenna and the matching circuit.

FIG. 5 shows the equivalent circuit diagram of the data transceiver 1 according to the invention in accordance with the second solution. The data transceiver once again has an antenna 6, which is modeled from a resistor $R_F$ and an inductor $L_F$. The resistor $R_F$ and the inductor $L_F$ are connected in series. Connected in parallel with the antenna 6 is a matching circuit 10 which can include an arbitrary connection of capacitors C and inductors L. In FIG. 5, the matching circuit C includes two capacitors $C_1$ and $C_2$. The matching circuit 10 also has a resistor R which is connected to the resistor $R_F$ of the antenna 6. The resistor R serves to limit the factor Q. The capacitor $C_2$ of the matching circuit 10 is connected on the one hand to the resistor R of the matching circuit 10, and also to the inductor $L_F$ of the antenna 6. The capacitor $C_1$ is connected to the tie point between the resistor R and the capacitor $C_2$. The other terminal of the capacitor $C_1$ is connected to a line 9 and to the inductor $L_F$ of the antenna 6. The line 9 can be, for example, a cable of unknown length which connects the matching circuit 10 to a power supply 3 and an internal impedance $R_W$. The line of unknown length in this case has a specific characteristic impedance, which is 50 ohms, for example. The internal impedance $R_W$ is a purely ohmic resistance and is matched to the characteristic impedance of the line 9. The matching circuit 10 assumes the task of matching the antenna 6 to the characteristic impedance of the line 9, that is to say the antenna 6 is tuned to resonance with the aid of the matching circuit 10. The inductive reactance of the antenna 6 is compensated by the capacitors $C_1$ and $C_2$ of the matching circuit 10. The internal impedance $R_W$ simulates the circuit configurations of the transmitting device or receiving device in a simplified way. The resistor R of the matching circuit 10 is inserted to limit the factor Q so that the bandwidth required for modulating the prescribed frequency is achieved.

In accordance with the idea of the invention, an additional loss resistance is inserted between the resistor R and the resistor $R_F$ of the antenna 6 as a function of the system requirements (number of data carriers, distance of the active range). This means simply that the resistor R of the matching circuit 10 may be substantially increased. This increase in the resistor R then leads to a reduction in the power requirement.

An estimate of the optimum resistor R is provided by the following formula (valid for a card whose resonant frequency deviates from the prescribed frequency $f_0$, that is to say $B_T$>>0 or $B_T$<<0, additionally $R_T$<|$B_T$|):

$$R \approx \frac{k_{min}(k_{max}(2\pi f_0)^2 L_F L_T}{2 \cdot |B_T|} - R_F.$$

in this case, $k_{min}$ and $k_{max}$ are the function limits (that is to say range) fixed by the system requirements.

The mode of operation of this procedure is explained below. The magnetic field generated by the data transceiver and/or by the antenna has so-called field gaps which are caused by periodic short-circuiting of the power supply. These field gaps serve to transmit data to the portable data carrier. By short-circuiting the power supply, the antenna 6, the matching circuit 10 and also the line 9 and the internal impedance $R_w$ form a resonant circuit. The current through the antenna 6 and/or the alternating magnetic field therefore decay inside these field gaps. The rate of decay is determined by the factor Q. If the factor Q of this resonant circuit is high, the antenna current and/or the magnetic field decays only slowly. It is, however, necessary that, for a fixed time—based on the length of the field gap, the antenna current and/or the magnetic field drops below a specific value so as to ensure that the circuit configuration 7 on the portable data carrier 2 can still evaluate this information. The factor Q must therefore be dimensioned such that the decay process is possible in a suitable way. In practice, this simply means that the factor Q is limited, for example, to a value of between 10 and 30. As already mentioned, the factor Q is determined by the resistor R in the matching circuit 10. The factor Q is calculated as follows:

$$Q = \frac{2\pi f_0 \cdot L_F}{R + R_F}.$$

If the resistor R of the matching circuit 10 is increased, the factor Q continues to drop. Consequently, a small factor Q has the advantage that the data transmission to the data carrier 2 and the data transceiver 1 can proceed quickly.

Norms or standards which limit the generation of magnetic fields for inductive energy transmission permit the generation of high fields only in a very narrow frequency band. This frequency band is generally too narrow for acceptable data transmission rates. This means that the sidebands, which are produced during the modulation, lie outside the narrow frequency band and must therefore have a substantially smaller amplitude, in accordance with applicable standards.

The sidebands can be limited by:

general reduction in the antenna current, specific modulation methods, and filter action (high Q).

The limitation of the sidebands by filter action is possible only to a limited extent, since information would otherwise be filtered out.

Figure 6:
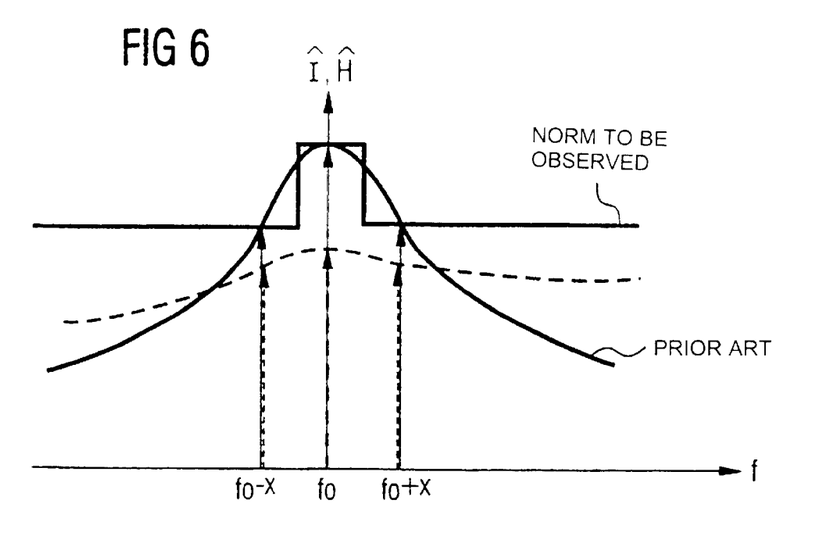
FIG. 6 is a graph illustrating the effect on the frequency response of various resistances between the antenna and the matching circuit.

The advantage of the invention becomes clear from FIG. 6, which illustrates the effect of an additional resistance on the frequency response. The amplitude of the antenna current and of the magnetic field H are plotted on the vertical axis (y-axis), while the frequency f is illustrated on the x-axis. The variation in the frequency response in the case of a data transceiver in accordance with the prior art with a factor Q of between 10 and 30 is illustrated in FIG. 6. The frequency response renders the envelope of the amplitude of the antenna current and of the magnetic field against frequency. The frequency response in accordance with the prior art has a high amplitude in the case of the frequency $f_0$ provided, and drops symmetrically on both sides. A small factor Q entails a frequency response which runs flat, that is to say poor filtering of frequency sidebands. A very high factor Q filters sidebands around $f_0$ somewhat, and exhibits a pronounced maximum in the frequency response at $f_0$. The actual information which is exchanged between the data carrier and the data transceiver is transmitted in a sideband symmetrically about the frequency $f_0$ provided. If the provided frequency $f_0$ is, for example, 13.56 MHz, the information is transmitted, for example, in the sidebands ±100 kHz. The amplitude of these sidebands is limited by the factor Q. The norm can be observed partially either by the filter action of the factor Q, but to a greater extent by reducing the antenna current. In the case of a configuration according to the prior art, however, the result of reducing the current is that the magnetic field still suffices only in a relatively small range to permit data transmission between the data carrier and data transceiver.

The filter action deteriorates when the factor Q is reduced, as is the case from the insertion of an additional resistance in the invention. This means simply that the frequency response exhibits a flatter course to the side of the prescribed frequency $f_0$. This poor filter action is more than compensated by the limitation of the antenna current by the additional resistor R. However, at the same time the range of the active field of the data transceiver is not reduced by the reduced antenna current. This comes about because, when a data carrier is introduced, the magnetic field is weakened substantially less sharply than in the case of a configuration in accordance with the prior art.

Figure 7:
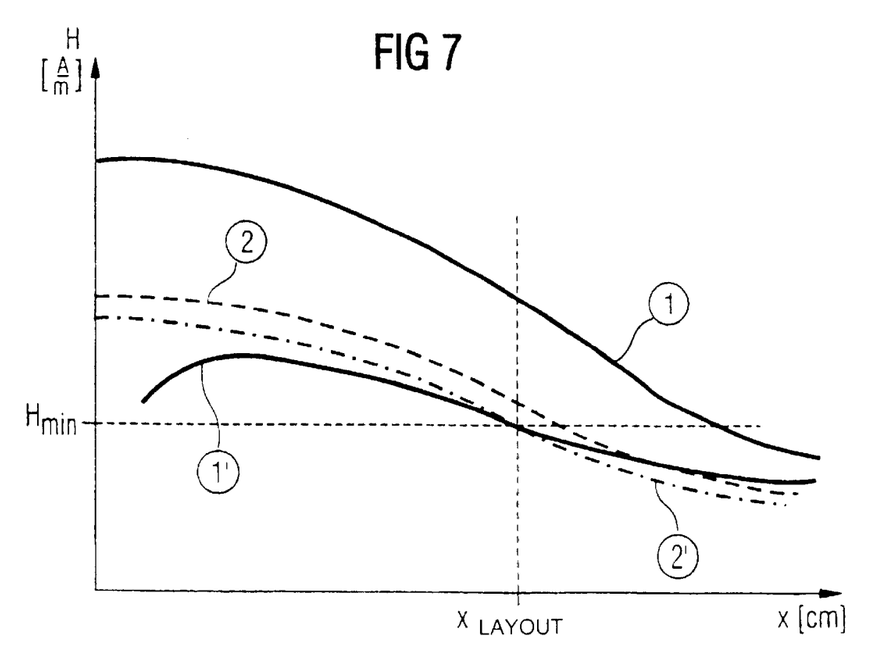
FIG. 7 is a graph illustrating the magnetic field characteristic, plotted against the distance between the data carriers and the data transceiver.

The magnetic field characteristic is illustrated in FIG. 7 and is plotted against the distance of a data carrier from the data transceiver. FIG. 7 shows a comparison of the magnetic field between a configuration in accordance with the prior art and the data transceiver according to the invention. Curves 1 and 2 show the strength of the magnetic field when no data carrier is located in the active field of the data transceiver. Because of the larger current through the antenna of the data transceiver, the magnetic field of a data transceiver in accordance with the prior art is substantially stronger than that of the device according to the invention. Curve 1 shows the field characteristic of a configuration in accordance with the prior art, while curve 2 shows a characteristic in accordance with the invention.

The magnetic field must exceed a value $H_{min}$ in order to permit data exchange between the data carrier and the data transceiver. Up to a point $X_{layout}$, the magnetic field must be greater than or equal to the minimum magnetic $H_{min}$ required. The current through the data transceiver in accordance with the invention is dimensioned such that the magnetic field slightly exceeds the minimum field strength $H_{min}$ for the required maximum range $X_{layout}$. By contrast therewith, because of the high current through the antenna in no-load operation, the magnetic field is substantially higher for a data transceiver in accordance with the prior art. If a data carrier is introduced into the active field of the data transceiver, because of the coupling the antenna current drops very sharply in a configuration in accordance with the prior art, and this entails a sharp reduction in the magnetic source field (curve 1'). If the data carrier is brought closer to the antenna of the data transceiver, a further drop in the antenna current is effected. This entails a further drop in the magnetic field strength. Consequently, it is possible to cut off the antenna current by introducing one or more further data carriers, that is to say it is no longer possible to exchange data between the data transceiver and the data carrier.

By contrast therewith, because of the additional resistance between the antenna and the matching circuit, the current through the antenna drops substantially less sharply. Consequently, when a data carrier is introduced into the active range of the data transceiver, the magnetic field is reduced only slightly by comparison with the field characteristic for no data carrier. The curve 2', which reproduces the field characteristic with a data carrier in the active range, is therefore higher, chiefly for small x, than the magnetic field characteristic for a device in accordance with the prior art (curve 1').

The invention will be explained with the aid of an example. Chip cards with the following exemplary parameters are used as portable data carriers. The chip cards have an operating frequency of $f_0$=13.56 MHz, the size of the card is approximately 8 cm×5 cm, the complex component of the total impedance of the chip cards is at $B_T \approx -140$ V/A, the resonant frequency of the chip card is at approximately 16.5 MHz, and the inductance of the coil is at $L_T \approx 3.5$ µH. The antenna of the data transceiver has dimensions similar to those of the chip cards. The inductance of the antenna of the data transceiver is $L_T \approx 2.3$ µH, and the chip cards must operate in a range of up to 1 cm. This yields coupling factors $k_{max}$=0.5 with a chip card laid on the antenna of the data transceiver, $k_{min}$=0.35 at maximum distance. Three chip cards at most can be inserted in the active range of the data transceiver. A simulation which determines the optimum value of an inductive reactance deliberately inserted into the antenna yields a minimum in the power made available by the power supply in the case of a reactive component of approximately 80 V/A (inductive).

This minimum in the power made available by the power supply remains virtually the same for real parts of the impedance of the antenna of the data transceiver of 0 to 40Ω, and is approximately 10 mW in the case without chip cards in the active field. If three chip cards are introduced into the active range of the data transceiver, the power consumed by the antenna is approximately 60 mW.

If an optimization in accordance with the second solution of the invention is assumed for the same parameters, that is to say an additional resistance is inserted between the antenna and the matching circuit, a power of approximately 200 mW is required for an optimally selected loss resistance. The additional loss resistance is calculated in this case through the use of the abovenamed formula.

In the case of a configuration in accordance with the prior art, in which the antenna is tuned to resonance, and in which the loss resistance has a value of approximately 15Ω in order to ensure the required bandwidth for data transmission, it would be necessary to provide approximately 500 mW.

A further point in favor of optimization through the use of an additional loss resistance between the antenna and the matching circuit is explained in the following. If, for example, chip cards with the above parameters are used ($f_0$=13.56 MHz, card size approximately 8 cm×5 cm, $B_T \approx -170$ V/A, $L_T \approx 3.5$ µH, $L_F \approx 3.5$ µH for the same antenna of the data transceiver, required range of a few cm: $k_{max}$=0.5, $k_{min}$=0.2), the result is an optimum loss resistance of approximately 25Ω. The resistor R for limiting the factor Q would be approximately 6Ω for dimensioning in accordance with the prior art. It is to be borne in mind in this case that the values of the capacitors $C_1$ and $C_2$ of the matching circuit have different values in the two cases, which are calculated in accordance with the dimensioning of the resistor R.

The maximum power consumption of the antenna circuit can be lowered from 80 mW to 30 mW by the simple circuit measure of increasing the loss resistance. As a result, the required current through the antenna of the data transceiver drops from 80 mA to 25 mA.

The optimum value of the additional loss resistance or of the additional inductive reactance in the antenna can be found in each case only by a complicated optimization calculation, the boundary conditions being prescribed by the system requirements (minimum and maximum range, number of cards, card properties, antenna prescribed as the case may be, operating frequency, etc.).

Fundamentally, it emerges that tuning the antenna to resonance in accordance with the prior art is the most unfavorable solution. In the case of systems with large required ranges and the high powers, associated therewith, of the antenna coil, optimization is possible only with difficulty, because the unavoidable loss resistances occurring can be greater than the optimum ones calculated.

Figure 8:
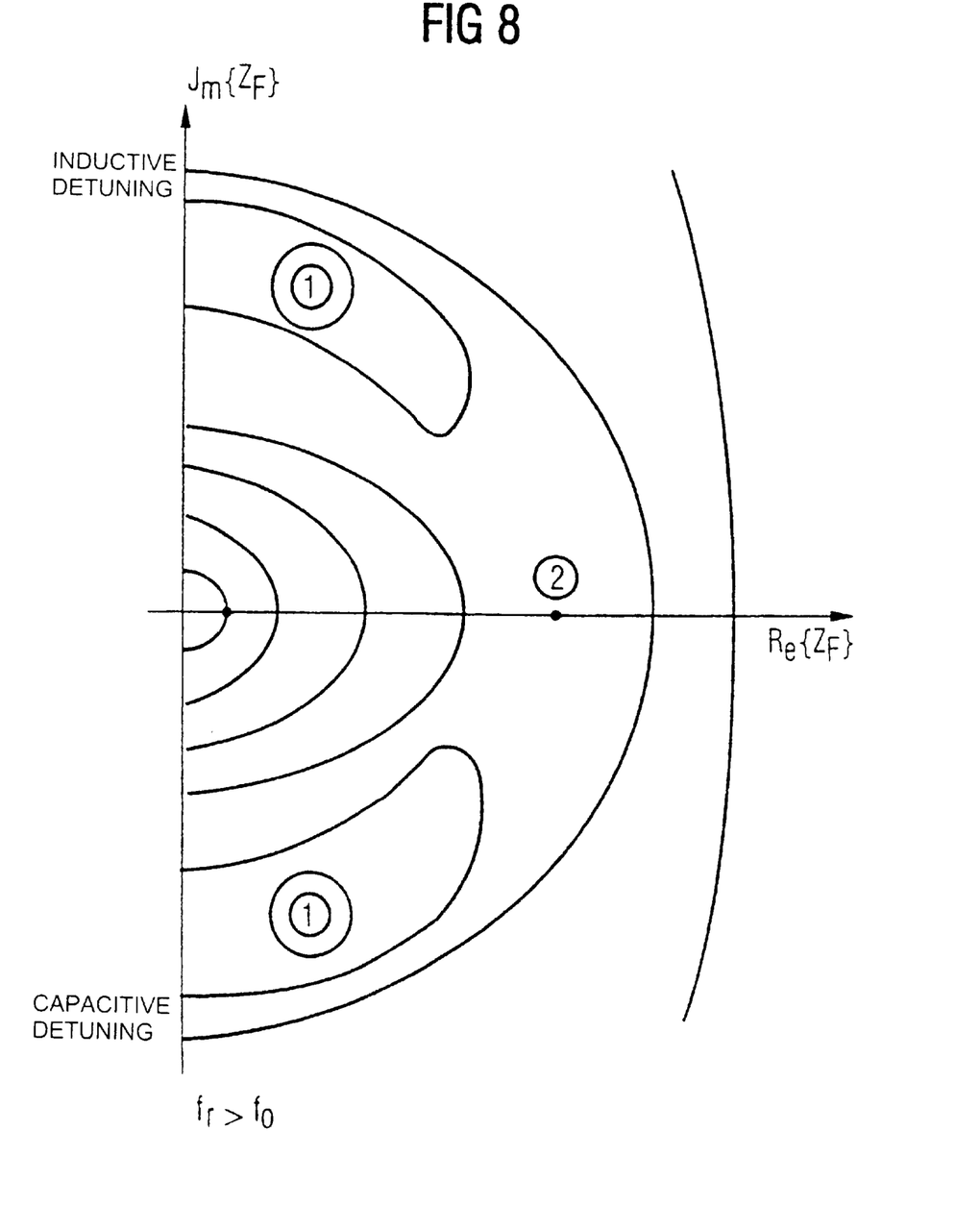
FIG. 8 is a graph illustrating the power consumption of the power supply for different layouts of the resistance and/or the reactance of the antenna.

The result of a simulation calculation is illustrated in FIG. 8. Lines of equal power consumption of the power supply in no-load operation are illustrated, that is to say for a different configuration of the resistance and/or of the inductive reactance of the antenna of the data transceiver. The real part of the antenna impedance is plotted on the x-axis, while the imaginary part of the antenna impedance is illustrated on the y-axis. The results illustrated are valid for a resonant frequency of the data carrier, which is above the prescribed frequency $f_0$ of the data transceiver.

The antenna is tuned to resonance in the case of a device in accordance with the prior art. This means that the impedance of the antenna has only an active component. Usually, active components are implemented with small loss resistances on an antenna in accordance with the prior art. This point of high power consumption is located on the x-axis close to the origin. Migrating further to the right on the x-axis, that is to say increasing the loss resistance of the antenna, necessitates an ever smaller power. The minimum power consumption is reached at a point 2, which has a resistance which is calculated using the above-described formula. If the point 2 on the x-axis is passed going further to the right, that is to say if the loss resistance is still further increased, the power consumption in a no-load operation also rises again. A point on the x-axis corresponds to an antenna tuned to resonance.

If, in accordance with the first solution of the invention, an inductive reactance is inserted into the antenna, that is to say a movement is made on the y-axis from top to bottom, in the case of relatively small resistances of the antenna there is a continuous reduction in the power consumption until the minimum power consumption is reached at the points marked by 1. In the circles marked by 1, the values for the impedance of the antenna are reached for which the smallest power is consumed. If the values of the inductive reactances as at the points marked by 1 are maintained, and the resistance of the antenna is further increased, for example above an additional loss resistance, the power required rises in turn. In a preferred embodiment, the power minimization is undertaken via a reactance in the antenna.

The invention achieves, in conjunction with a minimum outlay on circuitry, a cost-effective power reduction when generating an alternating magnetic field of a data transceiver for operating at least one data carrier.

The optimum can be found for both proposed embodiments only by optimization on the basis of the above-described system properties. The potential for optimization is greatest for so-called closed coupled systems.

We claim:

1. A device for a contactless transmission of data, comprising:

a data transceiver and a portable data carrier;

said data transceiver including:
a transmitting device for producing a first signal of a given frequency;
a receiving device for receiving a second signal of a given frequency;
a line of unknown length, said line having a characteristic impedance;
a data transceiver antenna connected to said transmitting device and to said receiving device via said line of unknown length;
a matching circuit configuration connected between said data transceiver antenna and at least one of said transmitting device and said receiving device, said matching circuit configuration having at least one resistance limiting a factor Q for matching a total impedance to the characteristic impedance of said line, and said matching circuit having an additional loss resistance;

said portable data carrier including:
a data carrier antenna for transmitting and for receiving an induced signal; and
a circuit configuration, connected to said data carrier antenna, for processing the induced signal and for producing a signal to be transmitted to said data transceiver antenna.

2. The device for a contactless transmission of data according to claim 1, wherein:

said data transceiver antenna has a first inductance $L_F$ and a given resistance $R_F$;

said portable data carrier has a second inductance $L_T$ and a reactance $B_T$;

said at least one resistance for limiting the factor Q and said additional loss resistance have a sum value R calculated with a formula $$R \approx \frac{k_{\min}(k_{\max}(2\pi f_0))^2 L_F L_T}{2 \cdot |B_T|} - R_F$$

where $k_{min}$ is a minimum coupling function limit, $k_{max}$ is a maximum coupling function limit, and $f_0$ is an operating frequency.

3. The device for a contactless transmission of data according to claim 1, wherein said portable data carrier has a resonant frequency lower than the given frequency of one of the first signal and the second signal.

4. The device for a contactless transmission of data according to claim 1, wherein said portable data carrier has a resonant frequency at least equal to the given frequency of one of the first signal and the second signal.

5. The device for a contactless transmission of data according to claim 1, wherein said circuit configuration is an integrated semiconductor chip component.

6. The device for a contactless transmission of data according to claim 1, wherein said circuit configuration is a circuit with discrete components.

7. The device for a contactless transmission of data according to claim 1, wherein said data transceiver antenna and said data carrier antenna are coupled to one another in a range from 0 to 4 cm.

8. The device for a contactless transmission of data according to claim 1, wherein said data transceiver antenna and said data carrier antenna are coupled to one another in a range from 0 to 15 cm.

9. The device for a contactless transmission of data according to claim 1, wherein said data transceiver antenna and said data carrier antenna are coupled to one another in a range from 0 to 1 m.

* * * * *